United States Patent
Nerone

(10) Patent No.: US 6,175,198 B1
(45) Date of Patent: *Jan. 16, 2001

(54) ELECTRODELESS FLUORESCENT LAMP DIMMING SYSTEM

(75) Inventor: Louis R. Nerone, Brecksville, OH (US)

(73) Assignee: General Electric Company, Schenectady, NY (US)

( * ) Notice: Under 35 U.S.C. 154(b), the term of this patent shall be extended for 0 days.

This patent is subject to a terminal disclaimer.

(21) Appl. No.: 09/318,343

(22) Filed: May 25, 1999

(51) Int. Cl.[7] .................................................... G05F 1/00
(52) U.S. Cl. ................... 315/291; 224/209 R; 224/248; 224/DIG. 4
(58) Field of Search ............................. 315/224, 209 R, 315/291, 307, DIG. 4, 322, 255, 243, 246, 248

(56) References Cited

U.S. PATENT DOCUMENTS

| | | | |
|---|---|---|---|
| 4,189,661 | 2/1980 | Haugsjaa et al. | 315/39 |
| 4,249,111 | 2/1981 | Gluck | 315/360 |
| 4,382,212 | 5/1983 | Bay | 315/225 |
| 4,680,508 | * 7/1987 | Rucki | 315/166 |
| 5,173,643 | 12/1992 | Sullivan et al. | 315/276 |
| 5,245,253 | * 9/1993 | Quazi | 315/224 |
| 5,291,100 | 3/1994 | Wood | 315/136 |
| 5,315,214 | 5/1994 | Lesea | 315/209 R |
| 5,373,217 | 12/1994 | Gregor | 315/248 |
| 5,561,351 | 10/1996 | Vrionis et al. | 315/248 |
| 5,744,912 | 4/1998 | So | 315/127 |
| 5,796,214 | 8/1998 | Nerone | 315/209 R |
| 5,825,130 | 10/1998 | Nerone et al. | 313/635 |
| 5,841,239 | 11/1998 | Sullivan et al. | 315/219 |
| 5,850,127 | 12/1998 | Zhu et al. | 315/307 |
| 5,864,212 | 1/1999 | Sullivan | 315/205 |
| 5,874,810 | 2/1999 | Nerone | 315/248 |
| 5,877,595 | 3/1999 | Nerone | 315/209 |
| 5,965,985 | * 10/1999 | Nerone | 315/DIG. 4 |

* cited by examiner

*Primary Examiner*—Haissa Philogene
*Assistant Examiner*—Ephrem Alemu
(74) *Attorney, Agent, or Firm*—Fay, Sharpe, Fagan, Minnich & McKee, LLP

(57) ABSTRACT

A ballast 10 for an electrodeless gas discharge lamp 30, incorporates a dimming circuit 12. Ballast 10 includes a load circuit 20 having an r.f. inductor 32 for generating an r.f. field to power electrodeless lamp 30. A voltage of an inductor 56 in a d.c.-to-a.c. converter 13 of ballast 10 is sensed by dimming circuit 12. Dimming circuit 12, which uses frequency-shift keying (FSK), couples inductor 56 to the dimming circuit 12 via dimming inductor 80, which in turn is connected to serially arranged dimming switches 82, 84. A signal generator 86 activates dimming switches 82 and 84 to provide a frequency shift to ballast 10. This frequency shift lowers the output to r.f. inductor 32, thereby turning off electrodeless lamp 30. Repeated switching by dimming circuit 12 causes a visual dimming in electrodeless lamp 30.

19 Claims, 3 Drawing Sheets

ELECTRODELESS FLUORESCENT LAMP DIMMING SYSTEM

FIELD OF INVENTION

The present invention relates to a ballast, or power supply circuit, for electrodeless fluorescent lamps of the type using regenerative gate drive circuitry to control a pair of serially connected complimentary conduction-type switches of a d.c.-to-a.c. converter. More particularly, the invention relates to a dimmable system of the ballast which allows dimming control of the fluorescent lamp.

BACKGROUND OF THE INVENTION

U.S. Pat. No. 5,796,214, U.S. Ser. No. 08/709,062, filed on Sep. 6, 1996 and U.S. Ser. No. 08/897,435, filed Jul. 21, 1997 all by the present inventor, discloses and claim ballasts for an electrodeless lamp. The ballasts include a d.c.-to-a.c. converter formed of a pair of serially connected switches having opposite conduction modes. For instance, one switch may be an n-channel enhancement mode MOSFET, and the other a p-channel enhancement mode MOSFET, with their sources interconnected at a common node. This allows a single control voltage applied to the gates, or control nodes, of the MOSFETS to alternately switch on one MOSFET and then the other. The foregoing ballasts allow the lamp to be in either an "on" state or an "off" state, but does not provide a matter of dimming the electrodeless lamp.

In existing electrode lamps, conventional methods continuously change the frequency of oscillation to control the amount of current flowing through an arc, and therefore the lumens output from the lamp. Attempting to apply this concept to electrodeless fluorescent lamp systems would result in overheating of the r.f. coil and the ballast switches. Additionally, conventional dimming methods will not produce a sufficient h-field to sustain a toroidal discharge when the arc current is reduced to less than 50% of rating. As the arc current decreases, the h-field decreases and the azimuthal e-field increases, causing the toroidal arc to extinguish and a longitudinal glow discharge to continue.

It would be desirable to provide a ballast, for an electrodeless lamp, which incorporates a dimming circuit to allow a range of dimming control for an electrodeless lamp.

SUMMARY OF THE INVENTION

An exemplary embodiment of the invention provides a ballast for an electrodeless gas discharge lamp. The ballast includes a load circuit having a r.f. inductor for generating an r.f. field to power the electrodeless lamp, in a resonant capacitance inductance network. A d.c.-to-a.c. converter circuit is coupled to the load circuit for inducing a.c. current therein to be used by the r.f. inductor. A dimming circuit, which uses frequency shift keying (FSK), is coupled to a drive circuit of the ballast. The dimming circuit is comprised of a secondary mutually coupled dimming inductor, serially connected dimming switches, and a signal generator. The frequency shift keying (FSK) shunts the voltage of the coupled secondary inductor when a pulse is applied to the gates of the dimming switches. When the pulse is applied to the gates of the dimming switches, frequency of the ballast is shifted to a higher level causing the r.f. inductor current to decrease, extinguishing the arc of the electrodeless lamp. By modulating operation of the dimming switches, the average power and therefore the average lumen output of the electrodeless lamp can be controlled.

DETAILED DESCRIPTION OF THE INVENTION

Figure 1:
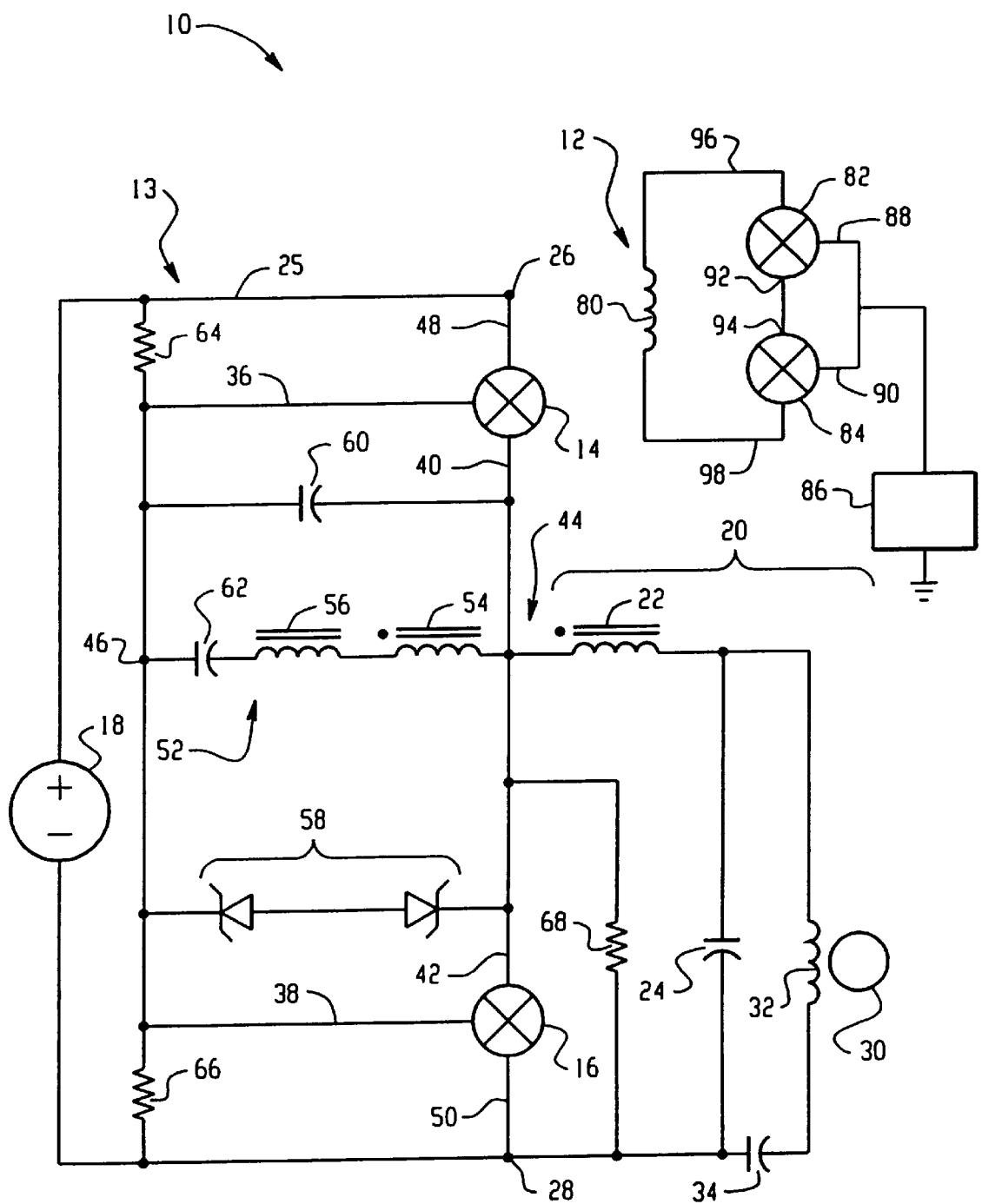
FIG. 1 is a schematic diagram of a ballast incorporating a dimming circuit according to the teachings of an embodiment of the present invention.

FIG. 1 shows an electrodeless lamp ballast circuit 10 incorporating a dimming system 12, in an embodiment of the present invention. A d.c.-to-a.c. converter 13 of ballast 10 includes switches 14 and 16 which are respectively controlled to convert d.c. current from a source 18, such as the output of a full-wave bridge (not shown) to a.c. current received by a load circuit 20 comprising a resonant inductor 22 and a resonant capacitor 24. D.c. bus voltage, Vbus, 25 exists between bus conductor 26 and reference conductor 28. Load circuit 20 also includes electrodeless lamp 30, and r.f. coil 32 which provides the energy to excite plasma of electrodeless lamp 30 to a state which generates light. A d.c. blocking capacitor 34 is connected between load circuit 20 and reference conductor 28. Other arrangements for powering electrodeless lamp 30 by load circuit 20 and arrangements alternative to capacitor 34 are known in the art.

In ballast 10, switches 14 and 16 are complementary to each other in the sense, for instance, that switch 14 may be an n-channel enhancement mode device, and switch 16 a p-channel enhancement mode device. Each of switches 14 and 16 include an inherent, reverse-conducting diode (not shown). When embodied as MOSFETs, each switch 14 and 16 has a respective gate, or control terminal, 36 and 38. The voltage from gate 36 to a source 40 of switch 14 controls the conduction state of that switch. Similarly, the voltage from gate 38 to a source 42 of switch 16 controls the conduction state of that switch. As shown, sources 40 and 42 are connected together at a common node 44. With gates 36 and 38 interconnected at a common control node 46, the single voltage between control node 46 and common node 44 controls the conduction states of both switches 14 and 16. The drains 48 and 50 of the switches are connected to bus conductor 26 and reference conductor 28, respectively.

Switches 14 and 16 could alternatively be embodied as Insulated Gate Bipolar Transistor (IGBT) switches, such as the p-channel and n-channel devices respectively. However, each IGBT switch would then be accompanied by a reverse-conducting diode (not shown). An advantage of IGBTs over MOSFETs is that they typically have a higher voltage rating, enabling a circuit with a wide range of d.c. input voltage values to utilize the same IGBTs. Further, switches 14 and 16 could be embodied as Bipolar Junction Transistor (BJT) switches, such as the NPN and PNP devices respectively. As with the IGBT switches, the BJT switches are respectively accompanied by reverse-conducting diodes (not shown).

Gate drive circuit 52, connected between control node 46 and common node 44, controls the conduction states of switches 14 and 16. Gate drive circuit 52 includes a driving inductor 54 that is mutually coupled to resonant inductor 22, and is connected at one end to common node 44. The end of inductor 22 connected to node 44 may be a tap from a transformer winding forming inductors 54 and 22. Inductors 54 and 22 are poled in accordance with the solid dots shown adjacent the symbols for these inductors. Driving inductor 54 provides the driving energy for operation of gate drive circuit 52. A second inductor 56 is serially connected to driving inductor 54 between node 46 and inductor 54. Second inductor 56 is used to adjust the phase angle of the gate-to-source voltage appearing between nodes 46 and 44. A bi-directional voltage clamp 58 between nodes 46 and 44 clamps positive and negative excursions of gate-to-source voltage to respective limits determined, e.g., by the voltage ratings of the back-to-back Zener diodes shown. A capacitor 60 is preferably provided between nodes 46 and 44 to predicably limit the rate of change of gate-to-source voltage between nodes 46 and 44. This beneficially assures, for instance, a dead time interval in the switching modes of switches 14 and 16 wherein both switches are off between the times of either switch being turned on.

A starting circuit includes a coupling capacitor 62 that becomes initially charged, upon energizing of source 18, via resistors 64, 66 and 68. At this instant, the voltage across capacitor 62 is zero, and, during the starting process, serial-connected inductors 54 and 56 act essentially as a short circuit, due to the relatively long time constant for charging of capacitor 62. With resistors 64–68 being of equal value, for instance, the voltage on nodes 44 and 46, upon initial bus energization, is approximately one-third of bus voltage 25. In this manner, capacitor 62 becomes increasingly charged, from left to right, until it reaches the threshold voltage of the gate-to-source voltage of upper switch 14 (e.g., 2–3 volts). At this point, upper switch 14 switches into its conduction mode, which then results in current being supplied by that switch to load circuit 20. In turn, the resulting current in the load circuit causes regenerative control of first and second switches 14 and 16.

During steady state operation of ballast circuit 10, the voltage of common node 44, between switches 14 and 16, becomes approximately one-half of bus voltage 25. With the voltage at node 46, between resistors 64 and 66 also being approximately one-half bus voltage 25 for instance, capacitor 62 cannot again, during steady state operation, become charged through resistors 64 and 66 so as to again create a starting pulse for turning on switch 14. During steady state operation, the capacitive reactance of capacitor 62 is much smaller than the inductive reactance of driving inductor 54 and inductor 56, so that capacitor 62 does not interfere with operation of those inductors.

Resistor 68 may be alternatively placed to shunt tipper switch 14 rather than lower switch 16. The operation of the circuit is similar to that described above with respect to resistor 68 shunting lower switch 16. However, initially, node 44 assumes a higher potential than node 46 between resistors 64 and 66, so that capacitor 62 becomes charged from right to left. This results in an increasingly negative voltage between node 46 and node 44, which is effective for turning on lower switch 16.

Beneficially, ballast circuit 10 does not require a triggering device, such as a diac, which is traditionally used for starting. Additionally resistors 64, 66 and 68 are non-critical value components, which may be 100 k ohms or 1 megohm each, for example. Preferably such resistors have similar values, e.g. approximately equal.

Figure 2:
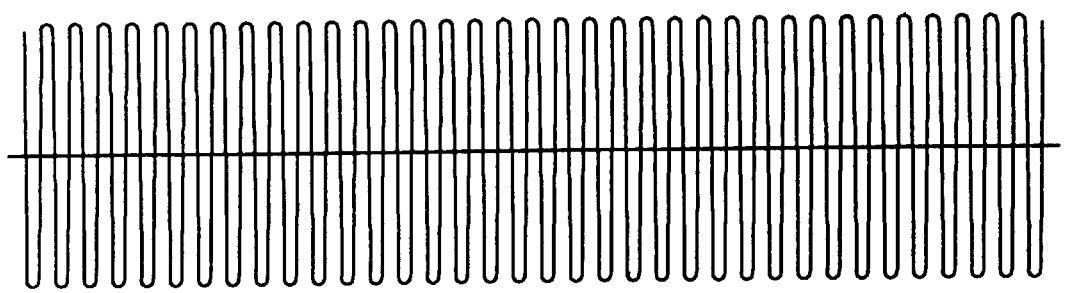
FIG. 2 illustrates the oscillation signal generated by the driving circuit of the ballast during normal circuit operation.

During normal lamp operation, electrodeless lamp 30 is energized by r.f. inductor 32 such that plasma in lamp 30 is excited and light is generated. When power to r.f. inductor 32 is shut off, the lamp enters an off state and plasma disperses with only ionized gas left in the lamp. When the power is turned back on, the lamp is re-ignited. Shown in FIG. 2 is an oscillation signal 100 which is provided to r.f. coil 32. In one embodiment of the invention oscillation signal 100 may operate at approximately 2.6 megahertz, which has approximately 400 nanosecond time periods.

Dimming circuit 12 operates to controllably alter the frequency, and in particular, to raise the frequency of signal 100 of the circuit, to thereby move the load circuit out of resonance which in turn causes the voltage supplied to inductor 32 to drop. In this manner, voltage needed to induce the plasma of electrodeless lamp 30 is not available and the lamp enters a shutdown state.

With particular attention to dimming circuit 12 of FIG. 1, this circuit uses a frequency shift keying (FSK) operation to achieve dimming of electrodeless lamp 30, by shifting the frequency of ballast circuit 10. Dimming circuit 12 includes dimming inductor 80 inductively coupled to inductor 56 of gate drive circuit 52. Optionally, if transformer formed by inductor 56 and inductor 80 is replaced by an inductor, dimming circuit 12 can shunt the inductor voltage. Inductor 80 is coupled to a pair of dimming switches 82, 84 which are driven by a signal generator 86. In this embodiment dimming switches 82 and 84 may be two n-channel MOSFETS, where sources 92, 94 are tied together and drains 96, 98 are each connected to dimming inductor 80.

Figure 3:
FIG. 3 illustrates a FSK pulse signal of the dimming circuit.
Figure 3:

FIG. 3 illustrates a FSK pulse signal which may be generated by signal generator 86 of FIG. 1. It is to be appreciated that signal generator 86 may be one of many known signal generators which can generate various waveforms of varying frequencies and with waveforms with varying pulse widths. When a pulse of FSK pulse signal 100 is applied to gates 88, 90 of transistors 82 and 84, the frequency of ballast circuit 10 is shifted higher, causing the r.f. coil current to decrease, extinguishing the arc of electrodeless lamp 30. Thus, a lower voltage is applied to r.f. coil 32, keeping the power dissipation in r.f. coil 32 and transistors 82 and 84 at safe levels.

Figure 4:
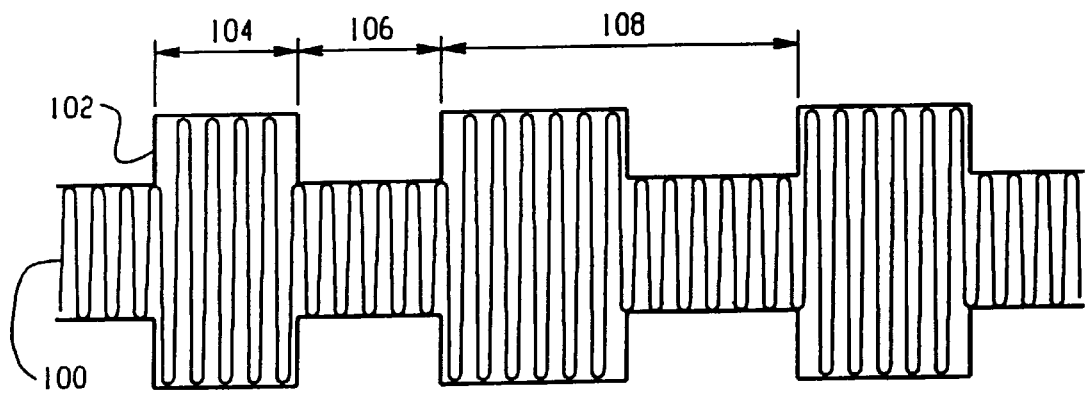
FIG. 4 illustrates the FSK pulse signal of FIG. 3 imposed upon the frequency line signal of FIG. 2.

With attention to operation of dimming circuit 12, FIG. 4 illustrates the frequency shift keying operation imposes the pulse wave form signal 102 of FIG. 3 onto the carrier signal 100 of FIG. 2. Specifically during a first time period 104, the carrier signal is operating at the desired 2.6 megahertz value. However, once dimming circuit 12 is activated, as shown during a second time period, 106, the carrier frequency is increased to approximately 2.8 megahertz. This change in frequency causes a shutdown of the lamp to occur.

It is noted that in this embodiment a FSK cycle 108 is approximately 2 kHz, and therefore is approximately a one-half millisecond time period. In this situation, the second time period 106 is approximately 0.5 millisecond. Therefore for the 0.5 millisecond time period the energy or power being put into lamp 30 is decreased. Thus, the amount of power being passed to lamp 30 is dictated by the width of the pulse supplied by pulse generator 86. By adjusting the pulse widths supplied, it has been experimentally shown that it is possible to obtain a range of dimming control for a duty cycle from approximately 0.2, which would lower the lumens output to 20% of total, to approximately a full on time of a 1.0 duty cycle such that the lumens output is 100%, meaning the lamp is on at all times. Due to the high frequency of the lamp operation, the human viewer does not see the rapid on and off transitions but rather averages the lumen output as an overall dimming effect. It is understood that such repeated on-off switching is not desirable in a conventional electrode lamp since repeated switching would destroy a lamp's electrodes.

Figure 5:
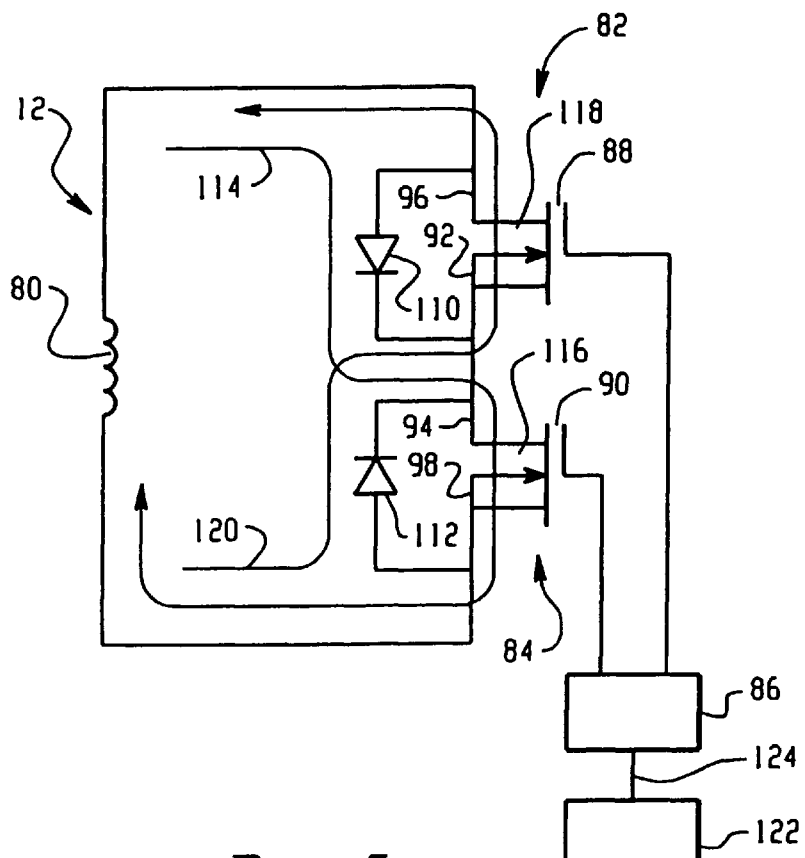
FIG. 5 is a more detailed view of the dimming circuit for an embodiment of the present invention.

Turning attention to FIG. 5, a more detailed review of dimming circuit 12 and its operation is set forth. As previously described, when signal generator 86 supplies a pulse to turn on transistors 82 and 84, inductively coupled inductor 80 acts as a voltage source for dimming circuit 12. Gate 88 of transistor 82 and gate 90 of transistor 84 are configured to receive the input pulse from signal source 86. Source 92 of transistor 82 and source 94 of transistor 84 are connected, and drain 96 of transistor 82 is connected to one end of inductor 80 while drain 98 of transistor 84 is connected to the opposite end of inductor 80.

Each of transistors 82, 84 has a diode 110, 112. These diodes are intrinsic to vertical transistors of the type being implemented in the present invention. It is to be appreciated that rather than imposing restrictions on the present invention, the intrinsic diodes are beneficially employed.

To activate dimming circuit 12, signal source 86 applies a signal of sufficient value to the gates 88 and 90, to exceed the threshold voltage of the gate source interface in order to turn on both transistors 82, 84 at the same time. By turning on transistors 82 and 84 current begins flowing in dimming circuit 12.

With attention to FIG. 4, during the second time period 106 when dimming circuit 12 is active, a number of positive and negative going transitions will occur in carrier wave 100. During a first going transition, current flow in FIG. 5, designated as 114, will flow through diode 110 and channel 116 of transistor 84. Flowing in this direction, the resistance in channel 118 of transistor 82 is sufficiently higher than resistance through diode 110, so that substantially all current flows through diode 110. Similarly, as diode 112 blocks current, current 114 passes through the channel 116 of resistor 84. During an opposite going time period of carrier signal 100, current 120 passes through diode 112 and channel 118 of switch 82, for similar reasons as previously discussed.

Figure 6:
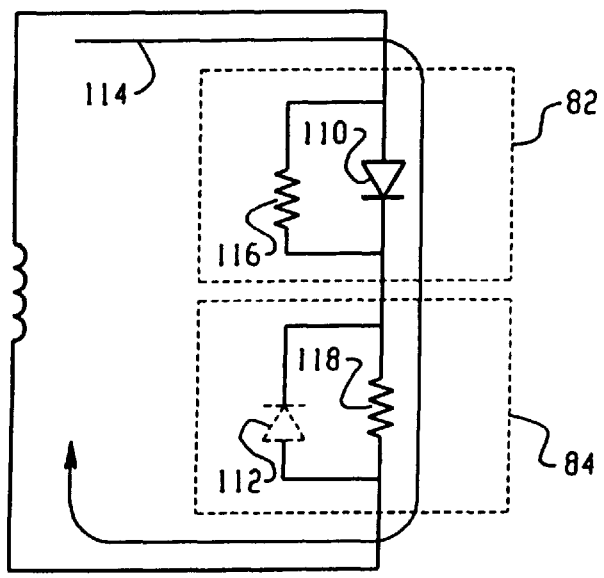
FIG. 6 details circuit flow of the dimming circuit.

To further describe this operation, attention is directed to FIG. 6, wherein current 114 is depicted in an equivalent resistive network. In this illustration, current 114 has a value of approximately 200 mA. As current moves through transistor 82, its potential paths are either through channel 116 which has a resistance drain-to-source on (RDS-on) value of approximately 5 ohms, or through positive going diode 110. Once transistor 82 has been turned on, the path with least resistance is diode 110, and substantially all of current 114 will pass through diode 110. When current moves through transistor 84, diode 112 presents a substantially higher resistance than the RDS-on of transistor 84, also approximately 5 ohms. Therefore substantially all the current flows through channel 118 of transistor 84. Thus, the dimming circuit 12 essentially is a transistor in series with a diode rather than two transistors in the series due to the existence of the intrinsic diodes 110,112. Under this arrangement, it is not necessary to use extremely low RDS-on devices as it is only necessary to ensure that the RDS-on of one transistor is sufficiently low, therefore in one embodiment transistors with RDS-on of up to 10 ohms or more may be used.

By modulating operation of transistors 82 and 84, with the wave form 102 shown in FIG. 3, the average power and therefore the average lumen output from lamp 30 can be controlled. Experimental data indicates that if the modulating wave form of FIG. 3 is approximately 2 kHz, the light output can be varied from 20% to 100%. If the FSK period 108 is substantially outside the 2 kHz range, desirable dimming does not occur as the signal does not allow lamp 30 to fully extinguish. On the other hand, if the modulating FSK wave form 102 is again substantially outside the 2 kHz range, lamp 30 stays extinguished for too long a time period and undesirable voltage overshoots will occur at restarting of the lamp.

Since lamp 30 has no electrodes to wear out, the present invention may be used as a low-cost design for dimming the electrodeless lamp system.

Typically, during the off time period of lamp 30, the input power to the system is less than 1.5 watts in a 23 watt system. When transistors 82 and 84 are turned off, allowing the r.f. coil current to increase and restart the lamp, the power increases to approximately 100%, i.e. 23 watts. This dimming system may be used with lamp systems of various wattages, including but not being limited to 23 watts, 50 watts and 100 watts.

It is further noted the 2 kHz modulating wave form may be varied slightly to provide synchronization with the power line frequency if necessary. Particularly, the ballast will have a line ripple due to filtering of input signals. Therefore it may be desirable, under certain circumstances, to provide a multiple of the ripple frequency so that the FSK modulating frequency is synchronized with the ripple. For example, it may be necessary to have the FSK modulating frequency at 10–15 times the ripple existing on the bus of the ballast.

It is also to be appreciated that it is possible to provide an operating set point to the dimming circuit 12, via a power line communication signal that can be supplied over a power line. For example as shown in FIG. 5, signal generator 86 is provided with operating parameters from remote source 122 via communication lines 124. Therefore the set point is provided remotely to the dimming circuitry. Another manner of transmitting a set point signal is to derive the set point from the power line and to provide a proportional signal to create pulse modulation used in the dimming circuit.

Ballast circuit 10 operates at a frequency typically of about 2.5–2.6 Megahertz, which is about 10 to 20 times higher than for the electroded type of lamp powered by an appropriate ballast circuit.

Exemplary component values for the circuit of FIG. 1 are as follows for a lamp 30 rated at 23 watts, with a d.c. bus voltage of 160 volts:

Resonant inductor 22 . . . 20 micro henries

Driving inductor 54 . . . 0.2 micro henries

Turns ratio between 22 and 54 . . . 35:1

Second inductor 56 . . . 1.5 micro henries

Capacitor 60 . . . 470 picofarads

Capacitor 62 . . . 22 nanofarads

Zener diodes 58, each . . . 7.5 volts

Resistors 64, 66 and 68, each . . . 270 k ohms

Resonant capacitor 24 . . . 680 picofarads

D.c. blocking capacitor 34 . . . 3.3 nanofarads

R.f. inductor 32 . . . 10 microhenries

Turns ratio between 56 and 80 . . . 1:1

While the invention has been described with respect to specific embodiments by way of illustration, many modifications and changes will occur to those skilled in the art. It is therefore, to be understood that the appended claims are intended to cover all such modifications and changes as fall within the true spirit and scope of the invention.

Additionally, switch 14 may be an IRFR210 or IRFR214, n-channel enhancement mode MOSFET, sold by International Rectifier Company, of El Segundo, Calif.; and switch 16, an IRFR9210 or IRFR9214, p-channel, enhancement mode MOSFET also sold by International Rectifier Company. Transistors 82 and 84 may be general application MOSFETS with 5–10 ohms. RDS-on and 50V maximum.

What is claimed is:

1. In a ballast for an electrodeless lamp, a dimming circuit for decreasing output of a d.c.-to-a.c. converter for selective dimming of the electrodeless lamp, said dimming system comprising:

a first dimming switch;

a second dimming switch connected in series to the first dimming switch;

a voltage source, a first-end of the voltage source connected to the first dimming switch and a second end of the voltage source connected to the second dimming switch;

a signal source configured to generate a modulated signal, supplied to the first and second dimming switches, wherein receipt of the modulated signal, initiates activation of the first and second dimming switches, and causes a current to flow through the first and second dimming switches, thereby decreasing the output of the d.c.-to-a.c. converter.

2. The dimming circuit according to claim 1 wherein the ballast circuit further includes:

a load circuit incorporating the electrodeless lamp and including a resonant inductance, a resonant capacitance, and a r.f. inductor;

the d.c.-to-a.c. converter is coupled to said load circuit for inducing an a.c. current in said load circuit, said d.c.-to-a.c. converter comprising:

(a) first and second switches serially connected between a bus conductor at a d.c. voltage and a reference conductor, and being connected together at a common node through which said a.c. load current flows;

(b) a control node further connecting said first and second switches at a location other than the common node, wherein the voltage between the control node and the common node determines the conduction state of the switches; and a gate drive arrangement for regeneratively controlling said first and second switches; said arrangement comprising:

(a) a driving inductor mutually coupled to said resonant inductor in such manner that a voltage is induced therein which is proportional to the instantaneous rate of change of said a.c. load current; said driving inductor being connected between said common node and said control node;

(b) a second inductor serially connected to said driving inductor, with the serially connected driving inductor and second inductor being connected between said common node and said control node and said second inductor mutually coupled to said voltage source in such a manner that a voltage is induced therein; and (c) a bi-directional voltage clamp connected between said common node and said control node for limiting positive and negative excursions of voltage of said control node with respect to said common node.

3. The dimming circuit according to claim 1 wherein when the dimming switches are active, the power supplied to the lamp is less than 1.5 watts.

4. The dimming circuit according to claim 1 wherein the modulating signal is approximately 2 kHz.

5. The dimming circuit according to claim 1 wherein the voltage source is an inductor of the d.c.-to-a.c. converter inductively coupled to an inductor of the dimming circuit.

6. The dimming circuit according to claim 1 wherein the voltage source is an inductor of the d.c.-to-a.c. converter.

7. The dimming circuit according to claim 1 wherein the modulating waveform is synchronized to a power line frequency.

8. The dimming circuit according to claim 1 wherein upon actuation of the dimming switches, frequency of the d.c.-to-a.c. converter is increased, and voltage applied to r.f. inductor is decreased.

9. The dimming circuit according to claim 1 wherein the first dimming switch and the second dimming switch are MOSFETS.

10. The dimming circuit according to claim 9 wherein the MOSFETS include intrinsic diodes.

11. The dimming circuit according to claim 1 wherein the dimming switches operate in accordance with an adjustable duty cycle.

12. The dimming circuit according to claim 11 wherein the duty cycle of the dimming switches is adjustable from a 20% duty cycle to 100% duty cycle.

13. The dimming circuit according to claim 11 wherein the duty cycle of the dimming switches are adjusted by a set-point provided to the signal source.

14. The dimming circuit according to claim 13 wherein the set point is provided remotely to the signal source.

15. A ballast circuit for an electrodeless lamp, comprising:

a resonant load circuit incorporating the electrodeless lamp and including a resonant inductance, a resonant capacitance and a r.f. inductor;

a d.c.-to-a.c. converter circuit coupled to said resonant load circuit for inducing an a.c. current in said resonant load circuit, said d.c.-to-a.c. converter circuit including an inductor across which is a voltage of the d.c.-to-a.c. converter;

a drive arrangement for controlling operation of said d.c.-to-a.c. converter circuit; and a dimming circuit for limiting voltage output of the d.c.-to-a.c. converter circuit, said dimming circuit comprising:

(a) a first dimming switch;

(b) a second dimming switch connected in series to the first dimming switch;

(c) a voltage source, a first end of the voltage source connected to the first dimming switch and a second end of the voltage source connected to the second dimming switch;

(d) a signal source configured to generate a modulated signal, supplied to the first and second dimming switches, wherein receipt of the modulated signal initiates activation of the first and second dimming switches, and causes a current to flow through the first and second dimming switches, thereby decreasing the output of the d.c.-to-.a.c converter.

16. A method of dimming an electrodeless fluorescent lamp energized by a ballast having a d.c.-to-a.c. converter which generates a voltage for an r.f. inductor for energizing the electrodeless fluorescent lamp, the dimming method comprising:

generating a voltage source proportional to a voltage supplied to the r.f. inductor;

supplying, from a signal source, a modulating signal to a switching network;

turning on the switching network for a selected duty cycle when the modulating signal is supplied to the switching network, wherein when the switching network is activated, a current flows through the switching network, whereby a switching frequency of the ballast is increased, which lowers the voltage supplied to the r.f. inductor, whereby repeated activation and deactivation of the switching network generates an altering of the lumens output resulting in a perceived dimming the electrodeless lamp output.

17. The method of dimming according to claim 16 wherein the duty cycles of the dimming network is adjustable so as to place the electrodeless lamp to an on state from 20% to 100% of a cycle of the modulating signal.

18. The method of dimming according to claim 17 wherein the modulating signal is approximately 2 kHz.

19. The method of dimming according to claim 17 wherein the modulating signal is controlled remotely of the ballast circuit.

* * * * *